(12) United States Patent
Alkan et al.

(10) Patent No.: US 11,100,407 B2
(45) Date of Patent: Aug. 24, 2021

(54) BUILDING DOMAIN MODELS FROM DIALOG INTERACTIONS

(71) Applicant: INTERNATIONAL BUSINESS MACHINES CORPORATION, Armonk, NY (US)

(72) Inventors: Oznur Alkan, Clonsilla (IE); Rachel K. E. Bellamy, Bedford, NY (US); Elizabeth Daly, Monkstown (IE); Matthew Davis, Cambridge, MA (US); Vera Liao, White Plains, NY (US); Biplav Srivastava, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 16/156,922

(22) Filed: Oct. 10, 2018

(65) Prior Publication Data
US 2020/0118008 A1    Apr. 16, 2020

(51) Int. Cl.
*G06N 5/02*    (2006.01)
*G06F 40/30*    (2020.01)
*G06F 40/279*    (2020.01)

(52) U.S. Cl.
CPC .......... *G06N 5/022* (2013.01); *G06F 40/279* (2020.01); *G06F 40/30* (2020.01)

(58) Field of Classification Search
CPC . G10L 15/22; G10L 15/1815; G10L 15/1822; G10L 15/26; G10L 15/18; G10L 15/08; G10L 15/24; G06F 17/30654; G06F 17/30401; G06F 17/30684; G06F 17/30976; G06F 40/279; G06F 40/30; G06N 5/022
USPC ............................................. 704/257, 251, 9
See application file for complete search history.

(56) References Cited

U.S. PATENT DOCUMENTS

| | | | |
|---|---|---|---|
| 9,189,742 B2 * | 11/2015 | London | G06N 5/04 |
| 9,201,923 B2 | 12/2015 | Weng et al. | |
| 9,472,185 B1 * | 10/2016 | Yeracaris | G10L 15/063 |
| 2016/0343378 A1 * | 11/2016 | Chen | G06F 16/3329 |
| 2017/0116982 A1 * | 4/2017 | Gelfenbeyn | G10L 15/22 |

FOREIGN PATENT DOCUMENTS

| | | |
|---|---|---|
| CN | 106559321 A | 12/2016 |
| CN | 106934452 A | 1/2017 |
| CN | 107357838 A | 6/2017 |

* cited by examiner

*Primary Examiner* — Jonathan Han
(74) *Attorney, Agent, or Firm* — Griffiths & Seaton PLLC

(57) ABSTRACT

Embodiments for building domain models from dialog interactions by a processor. A domain knowledge may be elicited from one or more dialog interactions with one or more users according to one or more dialog strategies. One or more domain models may be built and/or enhanced according to the domain knowledge.

18 Claims, 8 Drawing Sheets

| USER ID | UTTERANCE ID | UTTERANCE | DIALOGUE STRATEGY | SYSTEM UTTERANCE | TIME STAMP |
|---|---|---|---|---|---|
| 1 | 1 | *I WANT A SOFTWARE ENGINEER JOB IN US* | DIRECT ELICITATION | WHAT IS THE CRITERIA...? | |
| 2 | 1 | I AM LOOKING FOR A JOB IN NY | DIRECT ELICITATION | WHAT IS THE CRITERIA...? | |
| 2 | 2 | YES | DISAMBIG-UATION | IS NY PART OF US? | |

602

| TYPE | OBJECT | CONFIDENCE |
|---|---|---|
| FEATURE | LOCATION : NY | 0.1 |
| FEATURE | LOCATION : US | 0.1 |
| HIERARCHICAL RELATION | US -> NY | 0.1 |

BUILDING DOMAIN MODELS FROM DIALOG INTERACTIONS

BACKGROUND OF THE INVENTION

Field of the Invention

The present invention relates in general to computing systems, and more particularly to, various embodiments for building domain models from dialog interactions by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. The increasing complexity of society, coupled with the evolution of technology continue to engender the sharing of a vast amount of information between people. For example, as social media and internet communities continue to grow, a wealth of user-generated data is accumulating on the Internet, and there is a growing interest in exploiting this data for a variety of reasons.

SUMMARY OF THE INVENTION

Various embodiments for building domain models from dialog interactions by a processor, are provided. In one embodiment, by way of example only, a method for building feature spaces from dialog interactions with one or more users, again by a processor, is provided. A domain knowledge may be elicited from one or more dialog interactions with one or more users according to one or more dialog strategies. One or more domain models may be built and/or enhanced according to the domain knowledge.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is an additional block diagram depicting an example conversation processor in accordance with one or more embodiments described herein;

DETAILED DESCRIPTION OF THE DRAWINGS

Figure 1:
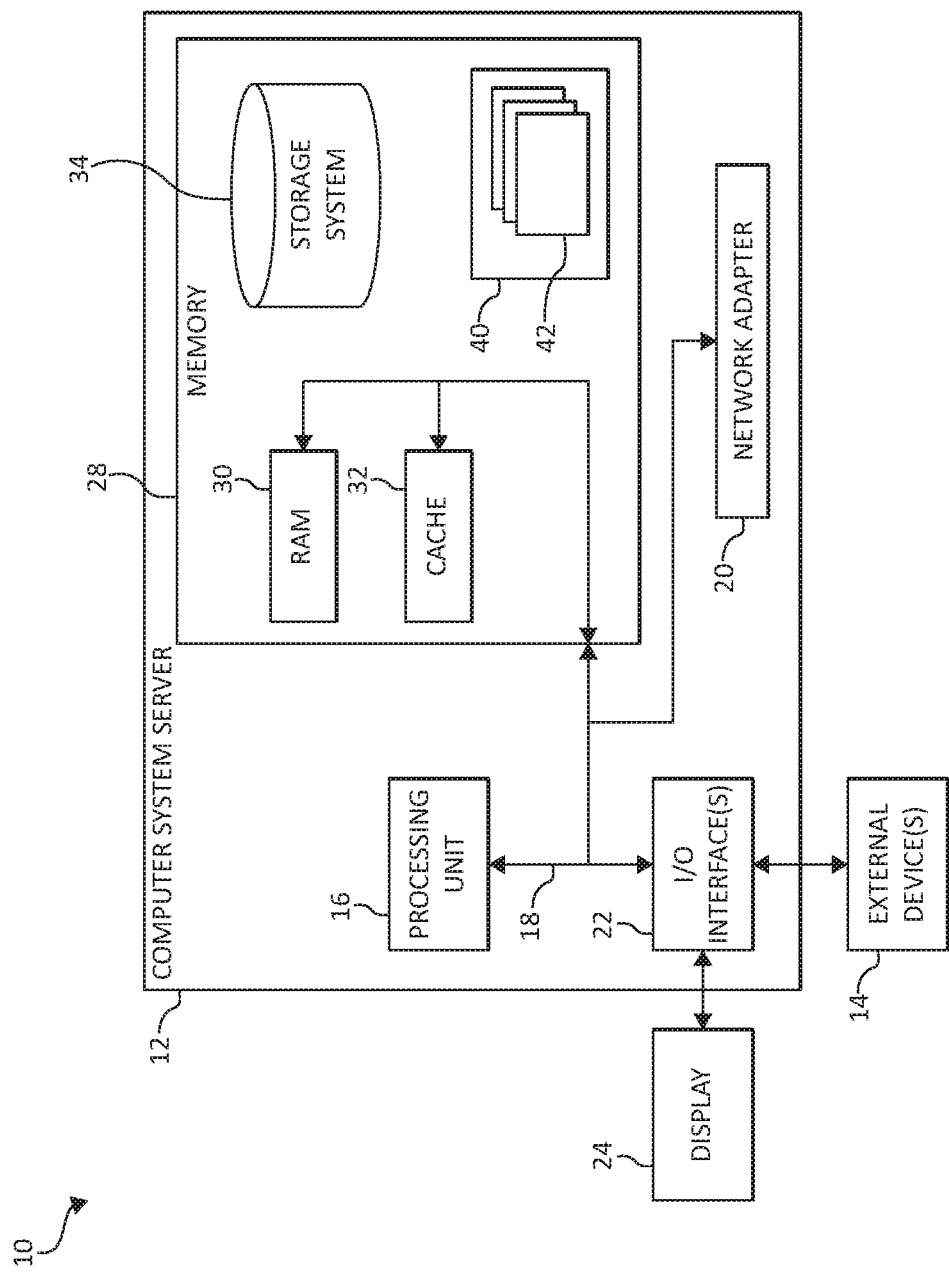
FIG. 1 is a block diagram depicting an exemplary computing node according to an embodiment of the present invention.

Domain modeling describes a means for understanding real world entities and the relationships between those entities. Domain modeling may provide various approaches related to solving a specific problem. A domain model may include a network of model objects that represent various entities within the domain model.

Said differently, as various spoken or natural language dialog systems have been developed, a representation, referred to as a domain model, may be used in the building and creating various system components. The domain model provides a useful, formalized representation of knowledge about the domain of an application that the system is addressing and reflects a particular domain expert's conceptualization of that knowledge.

A domain model may include various types of information. A feature may refer to a model object attribute or a model object reference (e.g., salary, full time or part time, location, require programming skills). An attribute may be a property of the model object, which includes the name and type of the attribute. For example, for a "book" model object, "numPages" may be the name of an attribute that relates to the number of pages in a book. The attribute type may also be defined as "integer", which may indicate the acceptable data entry values for the attribute are numerical values.

A reference (or relationship) may represent an association between two model objects, which may include a reference name and a reference type. The reference type of a model object may represent the model object to which the subject model object is associated. References among various model object in a domain model may create a network of model objects linked to each other by references. The resulting network of model objects may have a hierarchical tree structure. Therefore, each model object references to other model objects in a tree-like structure.

Relationships of features may include, for example, a hierarchical relationship (e.g., located in region A may be a subcategory of County A), a dependency relationship (e.g., full time job has higher salary than part time job of the same job title/position), and/or a priority order relationship. Items (e.g., "entities") may include, for example, actual jobs, represented by item profiles (e.g., feature-value pairs) such as, for example: 1) a salary feature: salary must be greater than (>) a defined salary threshold, 2) a full time or part time feature: full time, 3) a geographical feature of located in Country B: True; and/or 4) require programming skills feature: True.

Also, as used herein "domain interactions" may refer to a user's interaction (e.g., natural interaction) an interactive system (e.g., a conversational agent) that may use voice and/or text input. An "utterance" (e.g., a user utterance) may be a single, continuous piece of dialog prior to a response or action of the interactive system. In spoken or natural language dialog systems, the utterance may end upon a speaker concluding a word, phrase, or sentence(s) followed by a pause. In a text base system, the utterance may be concluded or ended upon a user completing a task of typing and/or upon confirmation of a communication posting.

In one aspect, learning domain knowledge is necessary to build domain-specific systems such as, for example, structured forms (e.g., databases, tagged fields) and/or unstructured forms (e.g., texts, notes, web pages). The domain knowledge may be processed to build feature spaces, which can be used for feature based systems such as, for example, recommenders, decision support systems, question and answer ("QA") systems. It should be noted that in machine learning, feature space refers to properties of an entity that is being described (e.g., tire size and a number of wheels are features of a car). Also, feature space may be a set of features describing an entity that can be used by a computational system (including but not limited to machine learning). However, a current challenge in learning domain knowledge is that domain knowledge in structured form is laborious to make available for use. More problematic is that the features are often limited and rigid, relying on a predefinition of scheme and unable to capture diverse and ever-changing user needs. Some operations may be used to learn domain features from unstructured data, but only in very limited contexts, where the data is noisy and provide limited information about the feature space. For example, domain features may be learned from unstructured data by discovering domain knowledge from a document itself (e.g., news recommender), by utilizing user tags (e.g., for photo, bookmarks) requiring a widely-adopted tagging system, by feature extraction from user reviews about items. However, the feature extraction in unstructured data is limited and challenging, for example, because users may not be motivated to provide feedback and reviews and also, without any structure, the data may be noisy and biased. Thus, a need exits for building feature spaces out of natural dialogs with users.

Accordingly, various embodiments of the present invention are directed to eliciting domain knowledge from a group of users through natural dialogs such as, for example, by using conversational agents, to construct, update and/or enhance feature spaces to be used by automated information systems. The present invention provides strategized dialogs so as to elicit domain-relevant information, which may be used to build/update domain feature spaces.

Additionally, one or more embodiments provide for building domain models from dialog interactions with one or more users. A domain knowledge may be elicited from one or more dialog interactions with one or more users according to one or more dialog strategies. One or more domain models may be built and/or enhanced according to the domain knowledge.

It should be noted as used herein, the dialog strategies may be used for updating one or more domain features. For example, the dialog strategies may include direct elicitation of preference and relevant features (e.g., identifying a location as a feature is of greatest importance to a collection of users), case-based critique, case comparison, and/or using, reasoning, or reflecting on previous user experiences.

The dialog strategies may be used for fulfilling feature profiles of items of dialog strategies. For example, the dialog strategies may include confirming values of item features (e.g., job A requires travel as confirmed by a user), comparing the items to fulfill group features, and/or soliciting review and/or feedback.

Through natural dialogs (e.g., dialog interactions between a dialog manager and a user), user knowledge may be learned, accessed, and/or determined about both feature structure and feature relationships, both from aggregated data and also from an explicit provision of the domain knowledge such as, for example, an explicit explanation. The natural dialogs may be used for eliciting domain knowledge for learning a dependence between features (e.g., a full-time job should be paid more than a part-time job; working hours should be arranged according to role and payment), learning an order of preference between features (e.g., working conditions of a job are more important than salary), and/or a providing trade-off of features (e.g., applicants are willing to take lower salary for more flexibility in work hours and location), and/or establishing/learning a hierarchy of features (e.g., community A is a city in region A).

In an additional aspect, a dialog manager, may directly query a user for feature relationships, an explanation or reason, and/or disambiguation using a one or more dialog strategies.

In one aspect, a domain knowledge may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

In one aspect, any operation described herein for determining, estimating, and/or calculating, and/or generating may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
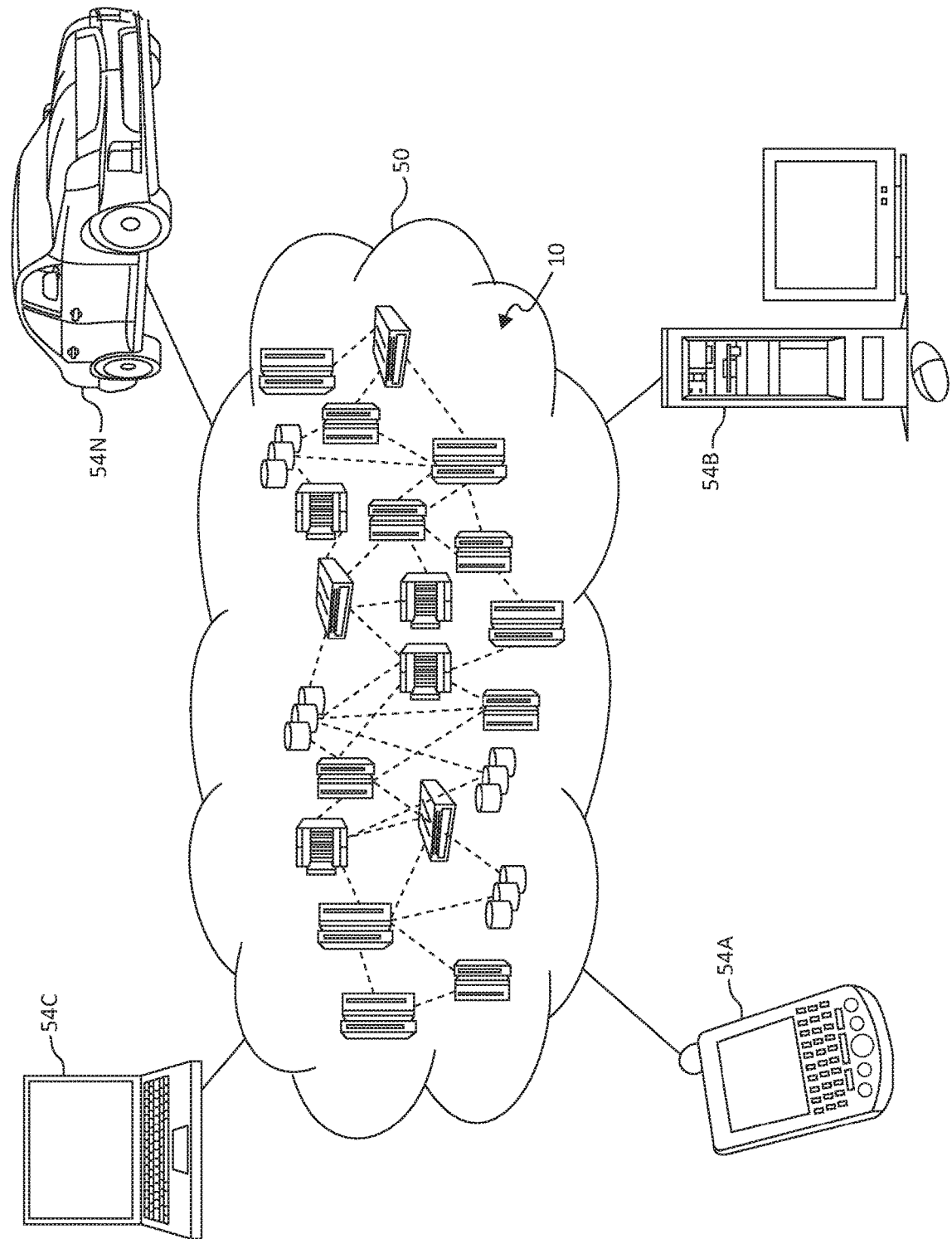
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
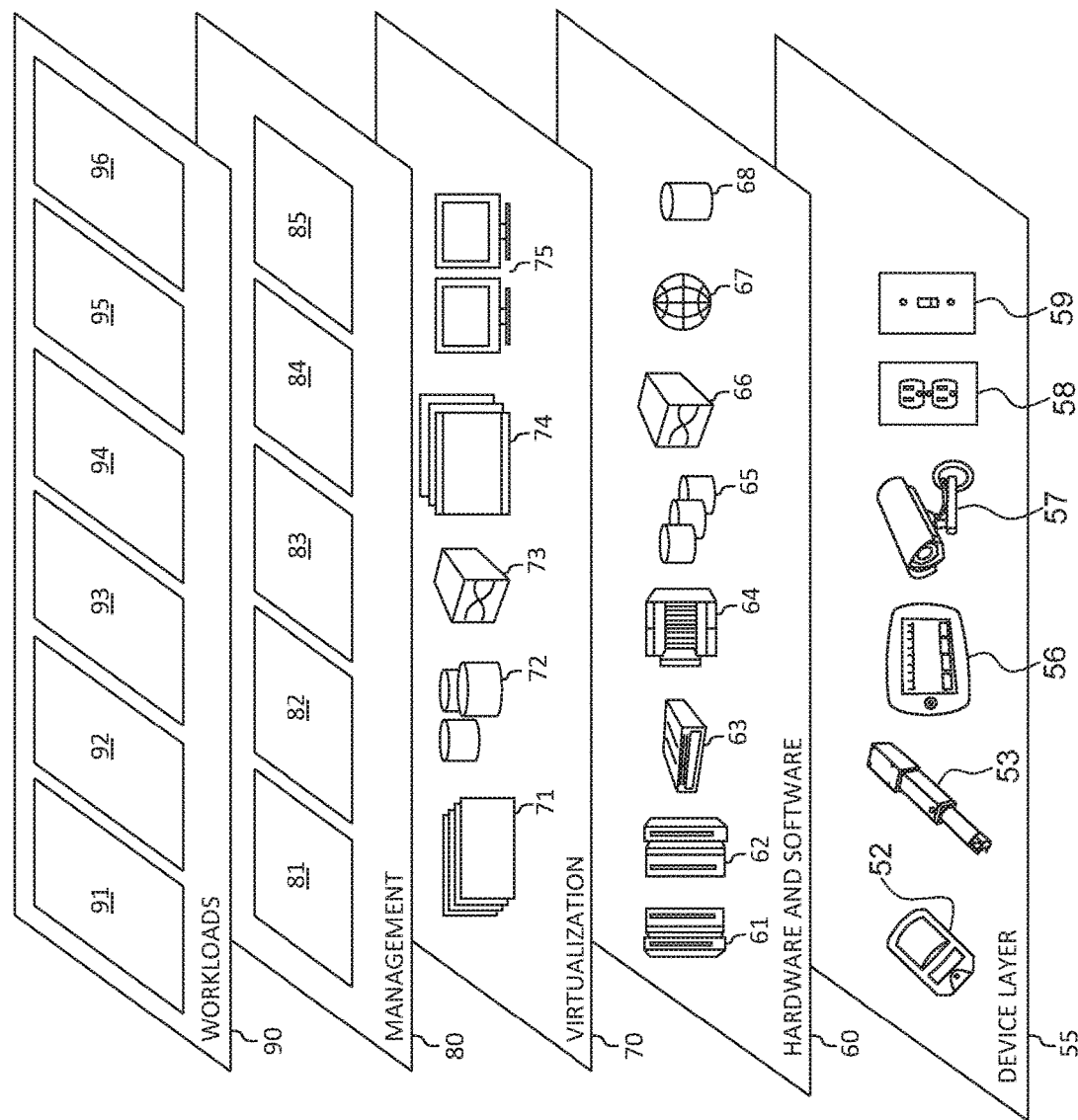
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for building domain models from dialog interactions. In addition, workloads and functions 96 for building domain models from dialog interactions may include such operations as data analytics, data analysis, and as will be further described, notification functionality. One of ordinary skill in the art will appreciate that the workloads and functions 96 for building domain models from dialog interactions may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
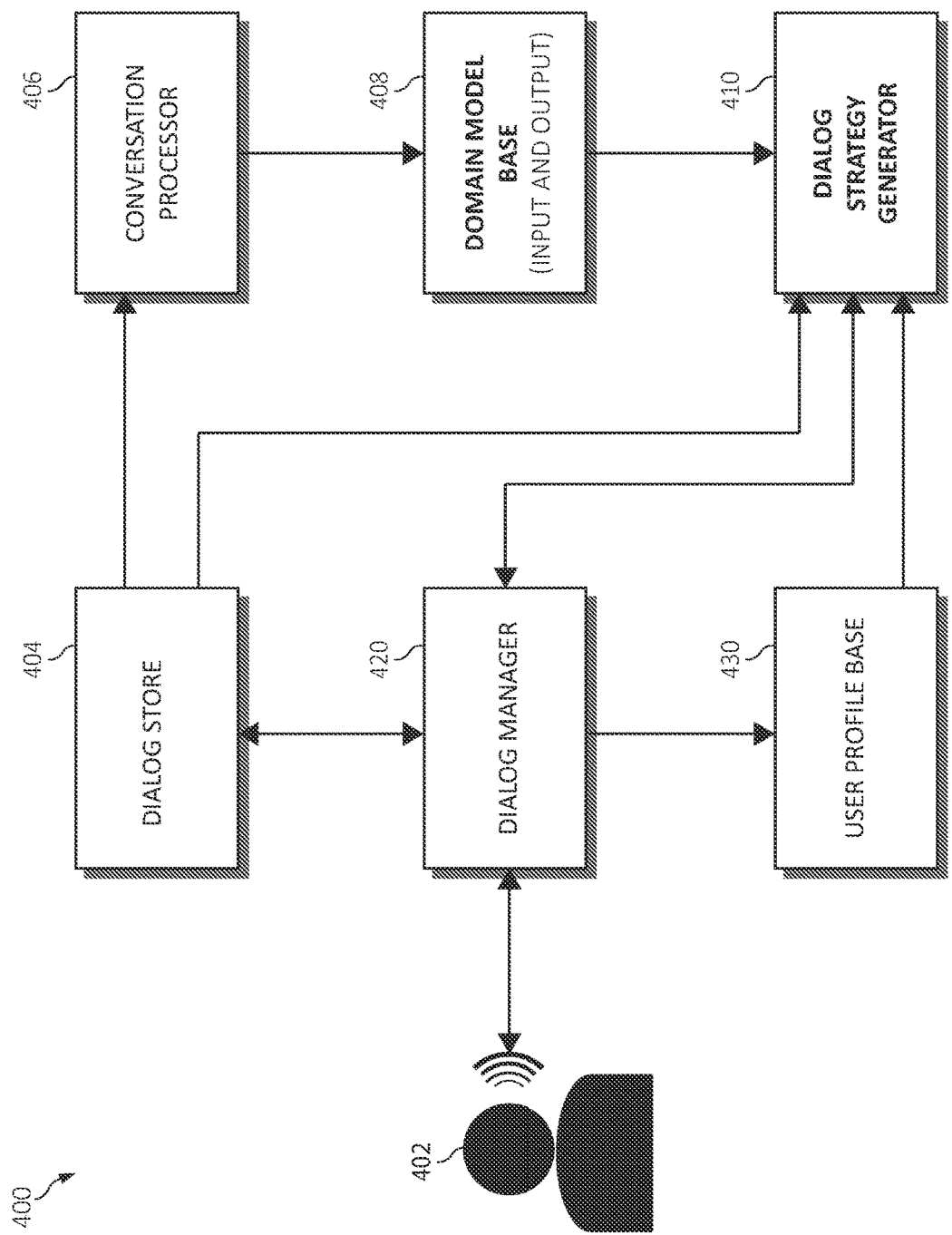
FIG. 4 is an additional block diagram depicting an example, non-limiting system that facilitates autonomously generating a domain model and/or an action model based on unstructured data in accordance with one or more embodiments described herein.

Turning now to FIG. 4, a block diagram of exemplary functionality 400 relating to building domain models from dialog interactions is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components, such as those described in FIGS. 1-3. Many of the functional blocks 400 may execute as background processes on various components, either in distributed computing components, or on the user device, or elsewhere.

As shown in FIG. 4, the system 400 may include a dialog strategy generator 410, a dialog manager 420, a user profile base 430, a dialog store 404, a conversation processor, and a domain model base 408.

A dialog strategy generator 410 may select a dialog strategy (e.g., domain knowledge elicitation strategy) for each dialog with one or more users such as, for example, user 402. The dialog strategy generator 410 may accesses the domain model base 408 having varied levels of completion for each of the domain models stored and/or maintained in the domain model base 408. The dialog strategy generator 410 may rank each of the dialog strategies according to a current domain model. Also, the dialog strategy generator 410 may access and/or use one or more historical dialogs with one or more users such as, for example, user 402 for ranking the dialog strategies. The dialog strategy generator 410 may consider a profile of each user such as, for example, each current user interacting with the system 400 so as to rank the dialog strategies. The dialog strategy generator 410 may also continuously track domain features over a selected period of time, update one or more feature spaces, and/or decrease less used feature for a domain feature size limit.

More specifically, the dialog strategy generator 410 and/or a dialog manager 420 may work together to elicit domain-relevant information from a group of users such as, for example, user 402 to determine a correct and/or appropriate query/queries at each point of a conversation, by optimizing for a set of parameters, including, but not limited to, efficient domain model construction, keeping a user within context, using interaction preferences of the dialog strategies, via, etc.

The dialog strategy generator 410 may include a strategy generator and a strategy ranker. The strategy generator may use a set of dialog strategy patterns for eliciting domain knowledge such as, for example, a direct elicitation of preference relevant features (e.g., features ranked by preferences that either a user has, or a computer system has obtained by some other means) as compared (e.g., versus) to case-based critiquing strategies. As an example of direct elicitation, a chatbot may indicate "So you are looking for a new job. What are the criteria you are looking for?" A user (e.g., user 402) may then respond with an appropriate response "I am looking for jobs located in city NY." As an example, of case-based critiquing, a chatbot may indicate "I found this job [URL] based in NY that pays more than a hundred thousand dollars. Will you be interested?" A user (e.g., user 402) may then respond with an appropriate response "hmm, I would prefer working for a larger company."

The strategy ranker of the dialog strategy generator 410 may rank generated dialog strategies (e.g., utility based, probabilistic, etc.) with one or more optimizing parameters such as, for example, maximizing information gain considering the learned features, feature values, feature relations, and/or maximizing information gain considering user profile, dialog length, constraints of user preference, etc. Examples of strategy ranking may include a using a current domain model, historical dialogs of the current users and all total users, and/or user profiles of current users and/or all total users.

For example, using a current domain model, 1) the strategy ranker may prioritize dialog strategies that directly elicit preference relevant features if few domain features known, and/or 2) the strategy ranker may prioritize dialog strategies that confirm about the items if one or more items are missing feature values. Using historical dialogs of the current users and all total users 1) the strategy ranker may prioritize dialog strategies if recently many persons mentioned feature X but there is a lack of confidence as to understanding of feature X, and/or 2) the strategy ranker may prioritize dialog strategies that may ask for explanations to discover unknown relations about one or more features if one or more users mentioned multiple features for the same item. Using user profiles of the current users and/or all total users, the strategy ranker of the dialog strategy generator 410 may prioritize dialog strategies asking for assistance to disambiguate uncertain feature relationships if the user is a domain expert.

The dialog strategy generator 410 may interact with the dialog manager 420 to recommend a type of query to issue to the user 402. The dialog manager 420 manages the entire communication process with the user 402 with functions including, but not limited to, initiating a dialog with one or more user such as, for example, user 402, repairing and clarifying communications/utterances, and/or closing the dialog with one or more user such as, for example, user 402.

The dialog manager 420 may perform the dialog interactions with the user 402 based on the recommended and/or prioritized dialog strategies, a user profile, a dialog history, or a combination thereof. The dialog manager 420 may use the dialog store 404 to store one or more communications (e.g., utterances) from dialog interactions with user 402 and also store the contextual information associated with the dialog interactions such as, for example, a dialog strategy, agent utterance (e.g., an agent of any automated system such as, for example, chatbot, robot, voice activated personal assistant and an agent utterance may be the output of the agent in the form of text, audio/voice data, visual/video data, or other modalities, etc.), user ID and time stamp.

The conversation processor 406 may extract targeted domain relevant objects (e.g., features, values, relationships) using, for example, natural language process ("NLP") pattern extraction operations. The domain model base 408 may update one or more domain models and/or build a new domain model upon reaching a confidence threshold for the targeted domain relevant objects (e.g., features, values and relationships.)

Thus, the input into the dialog strategy generator 410 may be a current domain model, one or more historical dialogs from the dialog store 404, and/or a user profile from the user profile base 430. The dialog strategy generator 410 may output (using one or more of the inputs) a learned and/or enhanced domain model (e.g., feature space) from inserting, deleting, updating one or more features, feature values, and/or relationships between the features of one or more domain models. The dialog strategy generator 410 elicits domain knowledge using a set of dialog strategy patterns with a user where the domain knowledge may be domain features, relationships between the domain features, priorities of frequency of feature use and occurrence, and/or feature profiles of items in the domain. The feature spaces may be updated by processing aggregated dialog interactions (e.g., aggregating dialog scripts) to improve pattern extraction with structure of a dialog strategy's context, previous utterances, and/or user profiles. Domain feature elements may be tracked to update and enhance the feature space, and, with a domain feature size limit, delete less used domain features from the domain model.

In this way, building feature spaces form dialog/conversations with a user may increase the accuracy of feature space representations that more accurately reflect user preferences and priorities while also increasing user satisfaction.

Figure 5:
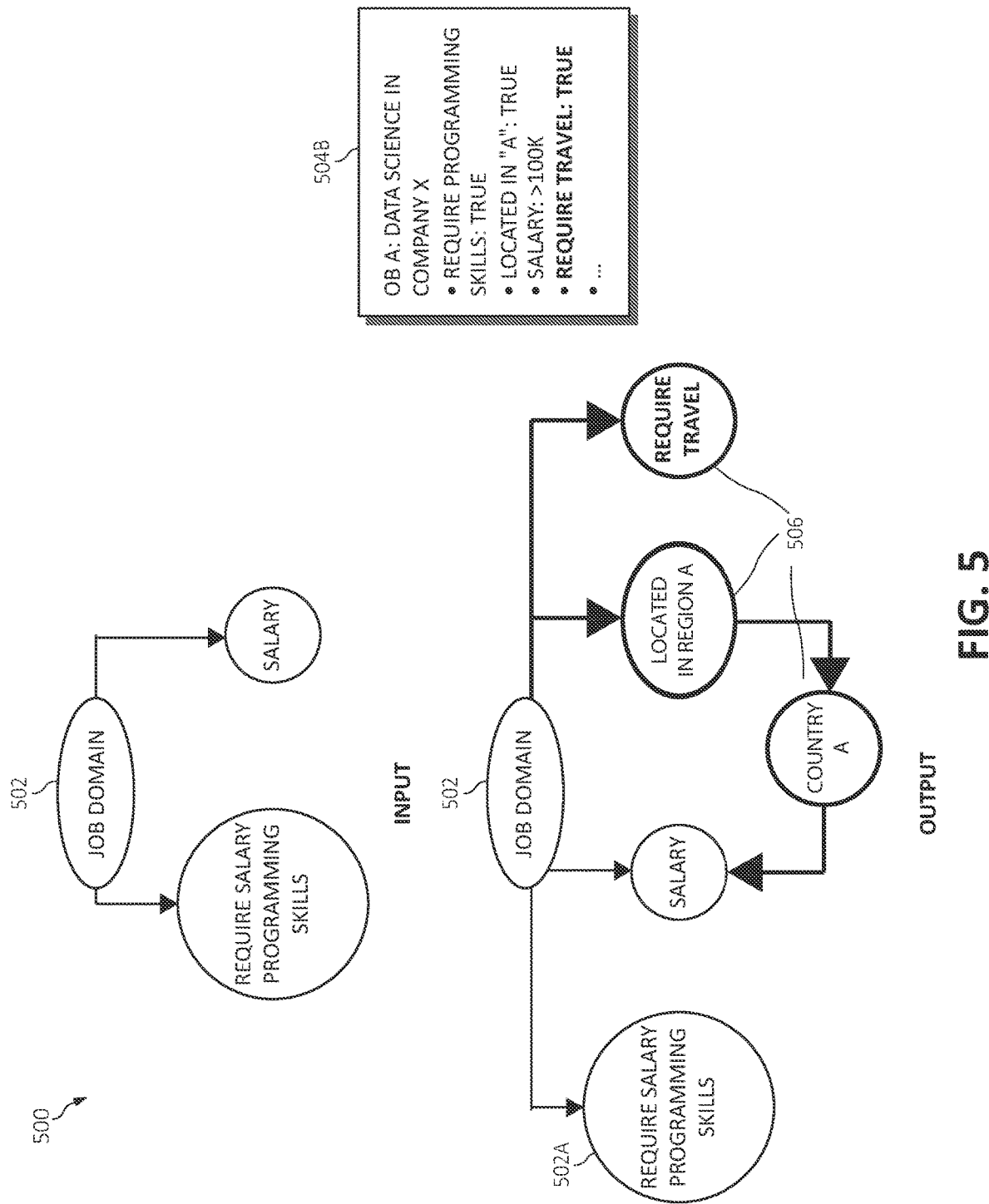
FIG. 5 is an additional block diagram depicting an example domain model in accordance with one or more embodiments described herein.

With the foregoing functional components 400 in view, consider some of the various aspects of the illustrated embodiments. FIG. 5 depicts an example domain model 500, which may be a domain model used in FIG. 4. That is, FIG. 5 may be used and/or employed in one or more aspects of FIGS. 1-4. Each of the various domain models may be of different forms of representation. By way of example only, the domain model 500 is a tree based graph. The domain model 500 may include one or more features represented as nodes. The relationship of the features may be represented by the edges and labels. The items may be represented by feature profiles. An agent may talk and/or communicate with a group of users.

For example, the dialog manager 420 of FIG. 4 (e.g., the agent) may use and/or determine from a base domain model 502 a job domain (e.g., user is looking for a Job "A" which is a data science job with company X) and the job requires programming skills and pays a defined salary (e.g., greater than 100 thousand (k) dollars). The dialog manager 420 of FIG. 4 (e.g., the agent) may talk and/or communicate with a group of users and learns from the communications 506 between the users that the job includes additional features such as, for example, the job is "located in country A," "located in region A," and the job does "require travel," which are frequently mentioned features from the communications/utterances with the users. The dialog manager 420 of FIG. 4 learns from additional communications/utterances 506 with the users that region A is part of country A, and jobs in region A have higher salary levels. The dialog manager 420 of FIG. 4 (e.g., the agent) may also learn that job "A" often requires travel, even though this is not in the job description. In this way, a domain knowledge (e.g., job domain), using a set of dialog strategy patterns with a user, is elicited.

FIG. 6 is an additional block diagram depicting an example output of using a conversation processor to determine feature spaces such as, for example, the conversation processor 406 of FIG. 4. That is, FIG. 6 may be used and/or employed in one or more aspects of FIGS. 1-5. As depicted, the dialog store may include a table 602 with columns and/or rows for saving various data such as, for example, a user ID, an utterance ID (e.g., ID of the user speaking the communication), an utterance, a dialog strategy, system utterance (e.g., dialog manager 420 of FIG. 4), a time stamp and/or table 604 showing a feature types, feature objects, and a confidence score of the features. The confidence score may be an assigned value, a percentage, and/or a value within a range of values for indicating a confidence of the elicited feature types and/or feature objects.

Using the conversation processor 406 of FIG. 4, each conversation with a user (e.g., user "1" and/or user "2" may be processed to learn a feature space as illustrated in table 604. Each utterance may be considered as an object set. One or more NLP operations may be employed and/or used by the conversation processor 406 of FIG. 4 to preprocess the utterances (e.g., stemming, part-of-speech ("POS") and entity tagging. Using one or more data pattern extraction operations (e.g., Apriori), the conversation processor 406 of FIG. 4 may extract targeted objects (e.g., features, values, relationships of the features for a domain model) and determine a confidence score. One or more NLP and/or cognitive reasoning operations of machine learning may be used to determine, understand, and/or learn semantics, ontologies (e.g., region A is located in Country A), and/or extract one or more relationships.

Figure 7:
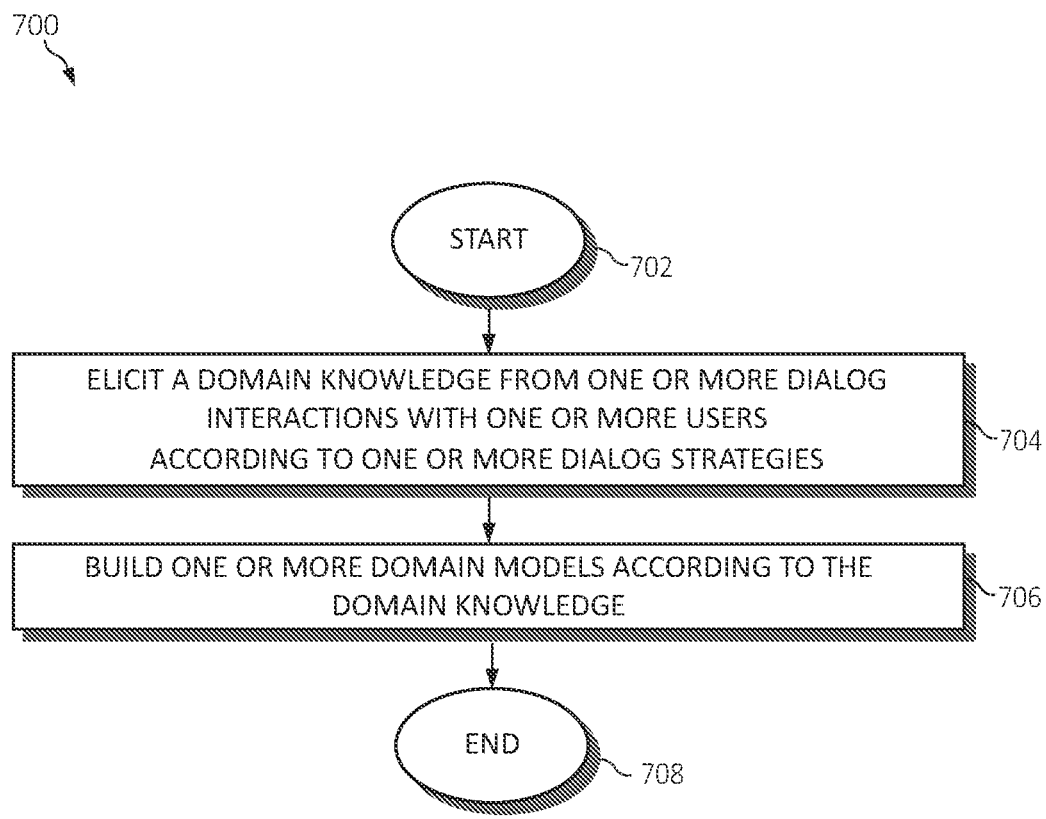
FIG. 7 is an additional flowchart diagram depicting an exemplary method for building domain models from dialog interactions by one or more processors, again in which aspects of the present invention may be realized.

Turning now to FIG. 7, a method 700 for building domain models from dialog interactions by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

A domain knowledge may be elicited from one or more dialog interactions with one or more users according to one or more dialog strategies, as in block 704. One or more domain models may be built and/or enhanced according to the domain knowledge, as in block 706. The functionality 700 may end, as in block 708.

Figure 8:
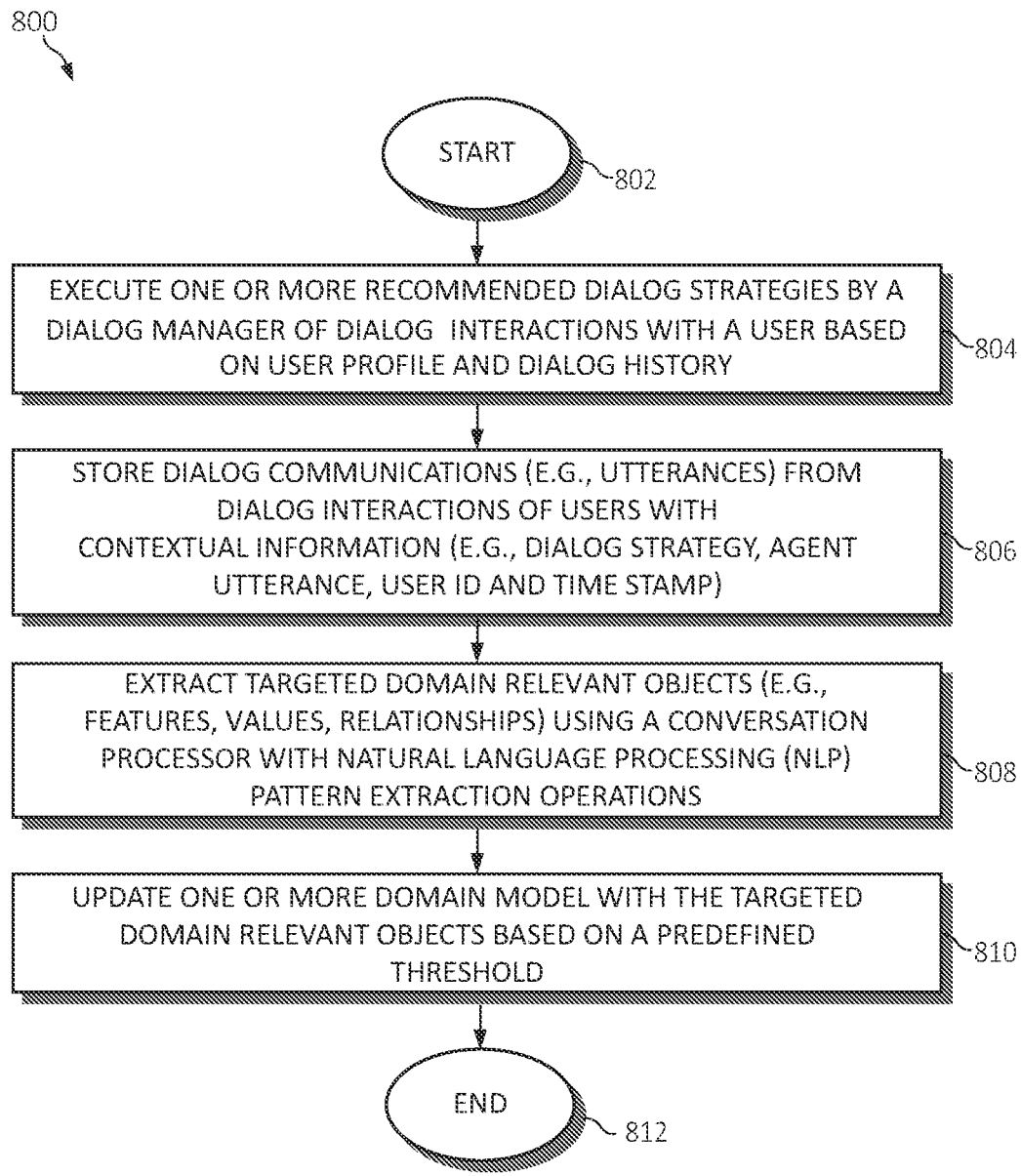
FIG. 8 is an additional flowchart diagram depicting an exemplary method for building domain models from dialog interactions by a processor, again in which aspects of the present invention may be realized.

Turning now to FIG. 8, a method 800 for building domain models from dialog interactions by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

One or more recommended dialog strategies may be executed (or used) by a dialog manager for dialog interactions with a user based on user profile and dialog history, as in block 804. The dialog communications (e.g., utterances) from dialog interactions of users may be stored with contextual information (e.g., dialog strategy, agent utterance, user ID and a time stamp), as in block 806. Targeted domain relevant objects (e.g., features, values, relationships, etc.) may be extracted using a conversation processor with natural language processing (NLP) pattern extraction operations, as in block 808. One or more domain models may be updated with the targeted domain relevant objects based on a predefined threshold, as in block 810. The functionality 800 may end, as in block 812.

In one aspect, in conjunction with and/or as part of at least one block of FIGS. 7 and 8, the operations of methods 700 and 800 may include each of the following. The operations of methods 700 and 800 may rank the one or more dialog strategies according to the one or more domain models, historical dialog interactions, one or more user profiles. One or more ranked dialog strategies may be selected for the one or more dialog interactions. The one or more dialog strategies may be executed during the one or more dialog interactions with the one or more users according to a user profile and a dialog history.

The operations of methods 700 and 800 may store communications and contextual information from the one or more dialog interactions with the one or more users. The contextual information includes a dialog strategy, one or more communications, a user identifier (ID), a time stamp, or a combination thereof. One or more target domain objects may be extracted from the one or more dialog interactions using a natural language processing (NLP) operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for building domain models dialog interactions by a processor, comprising:
   eliciting a domain knowledge from one or more dialog interactions with one or more users according to one or more dialog strategies;
   building one or more domain models according to the domain knowledge; and
   ranking the one or more dialog strategies according to at least one of the one or more domain models, historical dialog interactions, and one or more user profiles to enhance the one or more domain models, wherein ranking the one or more dialog strategies includes prioritizing those of the one or more dialog strategies that directly elicit preference relevant features or confirm feature data associated with specific features of the one or more domain models which lack the feature data or include missing feature values.

2. The method of claim 1, further including selecting one or more ranked dialog strategies the one or more dialog interactions.

3. The method of claim 1, further including executing the one or more dialog strategies during the one or more dialog interactions with the one or more users according to a user profile and a dialog history.

4. The method of claim 1, further including storing communications and contextual information from the one or more dialog interactions with the one or more users, wherein the contextual information includes a dialog strategy, one or more communications, a user identifier (ID), a time stamp, or a combination thereof.

5. The method of claim 1, further including extracting one or more target domain objects from the one or more dialog interactions using a natural language processing (NLP) operation.

6. The method of claim 1, further including updating the one or more domain models with one or more domain objects according to a predefined threshold.

7. A system for building domain models dialog interactions, comprising:
   one or more computers with executable instructions that when executed cause the system to:
      elicit a domain knowledge from one or more dialog interactions with one or more users according to one or more dialog strategies;
      build one or more domain models according to the domain knowledge; and
      rank the one or more dialog strategies according to at least one of the one or more domain models, historical dialog interactions, and one or more user profiles to enhance the one or more domain models, wherein ranking the one or more dialog strategies includes prioritizing those of the one or more dialog strategies that directly elicit preference relevant features or confirm feature data associated with specific features of the one or more domain models which lack the feature data or include missing feature values.

8. The system of claim 7, wherein the executable instructions select one or more ranked dialog strategies for the one or more dialog interactions.

9. The system of claim 7, wherein the executable instructions execute the one or more dialog strategies during the one or more dialog interactions with the one or more users according to a user profile and a dialog history.

10. The system of claim 7, wherein the executable instructions store communications and contextual information from the one or more dialog interactions with the one or more users, wherein the contextual information includes a dialog strategy, one or more communications, a user identifier (ID), a time stamp, or a combination thereof.

11. The system of claim 7, wherein the executable instructions extract one or more target domain objects from the one or more dialog interactions using a natural language processing (NLP) operation.

12. The system of claim 7, wherein the executable instructions update the one or more domain models with one or more domain objects according to a predefined threshold.

13. A computer program product for, by a processor, building domain models dialog interactions, the computer program product comprising a non-transitory computer-readable storage medium having computer-readable program code portions stored therein, the computer-readable program code portions comprising:
   an executable portion that elicits a domain knowledge from one or more dialog interactions with one or more users according to one or more dialog strategies;
   an executable portion that builds one or more domain models according to the domain knowledge; and
   an executable portion that ranks the one or more dialog strategies according to at least one of the one or more domain models, historical dialog interactions, and one or more user profiles to enhance the one or more domain models, wherein ranking the one or more dialog strategies includes prioritizing those of the one or more dialog strategies that directly elicit preference relevant features or confirm feature data associated with specific features of the one or more domain models which lack the feature data or include missing feature values.

14. The computer program product of claim 13, further including an executable portion that
   selects the one or more ranked dialog strategies for the one or more dialog interactions.

15. The computer program product of claim 13, further including an executable portion that executes the one or more dialog strategies during the one or more dialog interactions with the one or more users according to a user profile and a dialog history.

16. The computer program product of claim 13, further including an executable portion that stores communications and contextual information from the one or more dialog interactions with the one or more users, wherein the contextual information includes a dialog strategy, one or more communications, a user identifier (ID), a time stamp, or a combination thereof.

17. The computer program product of claim 13, further including an executable portion that extracts one or more target domain objects from the one or more dialog interactions using a natural language processing (NLP) operation.

18. The computer program product of claim 13, further including an executable portion that builds or updates the one or more domain models with one or more domain objects according to a predefined threshold.

* * * * *